Oct. 15, 1946.   J. D. BALLARD   2,409,339
INTERMIXING DEVICE
Filed Feb. 3, 1945
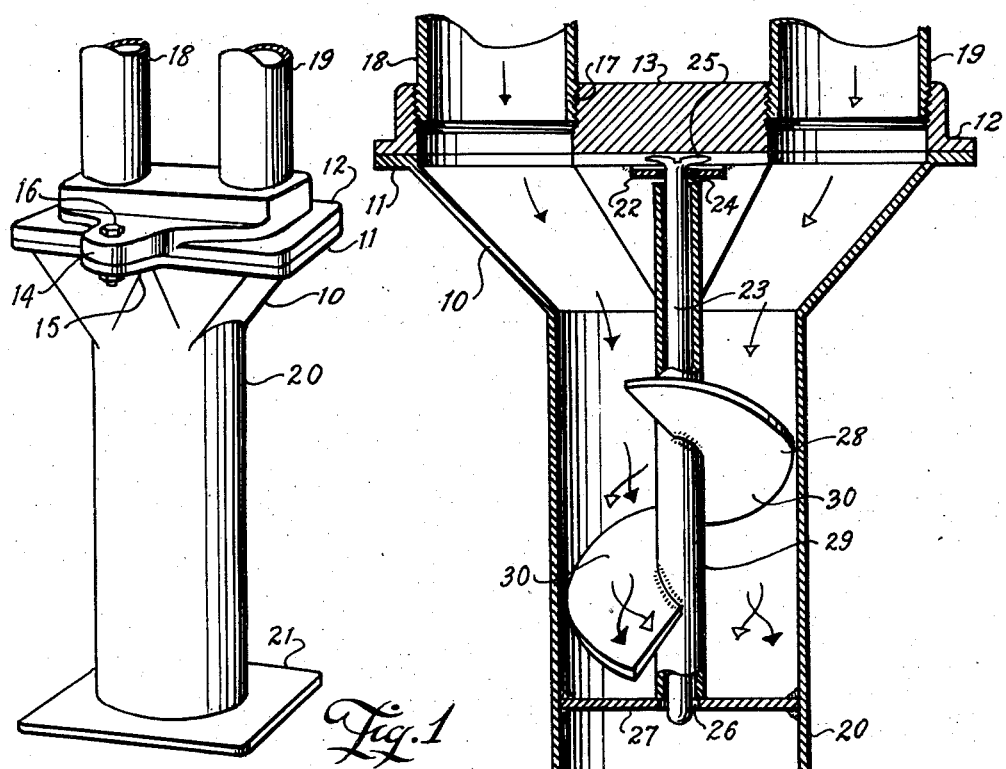
Fig. 1
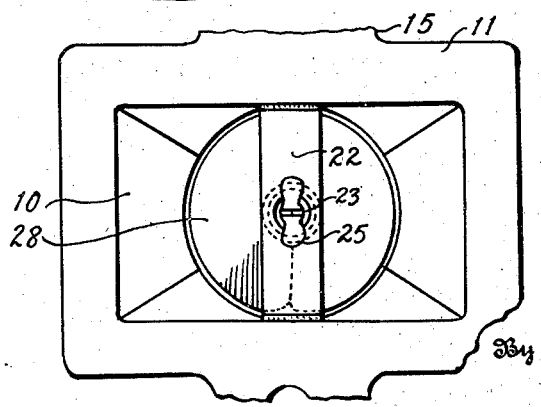
Fig. 4
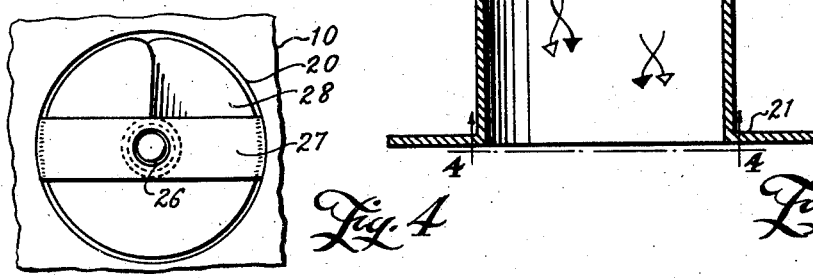
Fig. 3
Fig. 2
J. D. Ballard
Inventor
By 
Attorneys Patented Oct. 15, 1946

2,409,339

UNITED STATES PATENT OFFICE 2,409,339

INTERMIXING DEVICE

J. D. Ballard, Fort Worth, Tex.

Application February 3, 1945, Serial No. 575,999

2 Claims. (Cl. 259—9)

This invention relates to new and useful improvements in intermixing devices.

One object of the invention is to provide an improved device for producing what is commercially known as ribbon ice cream, sherbet and the like, but may be used for ribbonizing other differentiated, fluent commodities.

A particular object of the invention is to provide an improved device into which fluent, differentiated commodities, such as ice creams of different colors and flavors, may be fed from separate sources and automatically stratified or intermingled in such a manner as to produce a variegated mass in through which one of the creams runs in a ribbon-like effect in contrast to the rest of the mass.

A further object of the invention is to provide a simple device of the character described wherein the means for ribbonizing the commodities is motivated by a flowing mass, thus requiring no auxiliary motive power or complex elements.

A construction designed to carry out the invention will be hereinafter described together with other features of the invention.

The invention will be more readily understood from a reading of the following specification and by reference to the accompanying drawing, wherein an example of the invention is shown, and wherein:

Fig. 1 is a perspective view of a device constructed in accordance with the invention, Fig. 2 is a vertical sectional view of the device, Fig. 3 is a plan view of the hopper and component parts, and Fig. 4 is a partial bottom view of the device.

In the drawing, the numeral 10 designates a generally rectangular hopper having an outwardly directed marginal flange 11 at its top. A complementary cap plate 12 rests upon the flange and formed integral therewith, is provided with an upstanding transverse boss 13.

The boss is provided on its front and rear sides with reduced ears 14 registering with ears 15 projecting from the flange 11. Bolts 16 passing through the ears 14 and 15, removably fasten the hopper to the plate. The boss is provided with spaced internally screw-threaded openings or inlets 17, into which feed pipes 18 and 19, respectively, are screwed. These pipes may lead from ice cream making machines or other sources to feed creams of different flavors and different colors into the hopper 10.

The hopper is in the form of a transition in that it is merged at its lower end into a vertical cylindrical spout 20. The spout may have a marginal rectangular flange 21 at its lower end for connecting it to other apparatus or the flange may be omitted and the spout used to deliver the ribbonized stream directly into a suitable container (not shown).

A cross bar 22 is secured across the top of the hopper slightly below the flange 11 and an elongate pin or shaft 23 is inserted through an aperture 24 in the center of said bar. The shaft, which is nonrotating, has a head 25 resting upon the bar, whereby said shaft is removably supported. The lower end of the shaft is preferably rounded so as to pass through an aperture 26 in a lower cross bar 27, suitably secured in the spout, as by welding. This lower bar is preferably located a substantial distance above the lower end of said spout.

A ribbonizer 28 is loosely journaled on the shaft 23 between the bars so as to freely rotate and includes an elongate axial sleeve 29, surrounding the shaft and a helical vane 30. The internal diameter of the sleeve is such as to give said sleeve a loose fit around the shaft, whereby very free rotation of the ribbonizer is provided. The helical edge of the vane has a relatively close turning fit in the spout, sufficient clearance being provided to assure free rotation without bypassing the stream.

The inner helical edge of the vane is suitably secured around the sleeve, as by welding. The vane is preferably not given more than substantially one complete turn or flight around the sleeve, because it is not the purpose to mix the commodities to the extent that the mass becomes mottled or that the individual creams lose their distinctions. The vane is made just long enough to intermingle the commodities only sufficiently to ribbonize them.

It is preferable to terminate the vane below the bottom of the hopper so as to give the commodities an opportunity to enter the spout before being agitated, as well as to keep such commodities more separately intact until they enter said spout. The sleeve extends below the vane so as to rotate on the lower bar 27 and provide ample clearance between said vane and the bar to prevent choking.

In describing the operation it will be assumed, for the purpose of illustration, that chocolate ice cream from a packaging (batch) or a continuous freezing machine is fed through the pipe 18 and that vanilla ice cream is supplied from another similar machine through the pipe 19 into the hopper 10. Since the pipes are cylindrical and are spaced so as to deliver their streams at opposite sides of the rectangular upper end of the hopper 10, and since such sides are inclined and substantially flat, the streams will slide down the same to the spout 20. Owing to the fact that substantially no agitation occurs in the hopper, little or no intermixing of the commodities occurs in the passage down through the hopper.

Upon entering the upper end of the spout the commodities will come into intimate contact and will unite in a single stream, but will not intermix. This stream will flow down onto the upper portion of the vane 30 of the ribbonizer 28 and substantially fill the cross-sectional area of the spout. The ribbonizer offering negative resistance will thus be rotated by the downwardly flowing stream and the two commodities, thus intermingled or figuratively, twisted, so as to produce a variegated or ribbonized mass as the stream passes along said vane. The stream after leaving the vane will flow down the spout and discharge therefrom.

Due to the thick consistency of ice cream and the like, the chocolate and vanilla creams will to a large extent remain segregated, but the mass will exhibit a variegated or ribbonized effect which will be preserved in the dispensing of said mass. As the ribbonizer 28 offers little or no resistance to the flow of the stream, but freely rotates, such flow will not be appreciably impeded.

The device is readily cleaned. By removing the bolts 16, the hopper 10 and spout 20 may be easily detached. The shaft 23 may be removed simply by grasping the head 25 and pulling upwardly. This will permit the sleeve 29 to be tilted to one side of the upper bar 22 and by pulling said sleeve upwardly and turning it in a clockwise direction, the vane will be screwed out of the hopper. The separated parts may then be thoroughly cleansed.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A device for producing a single variegated frozen commodity from at least two moving different frozen commodities from separate sources of supply including, a single conduit having a plurality of spaced inlets at one end thereof and for conducting the said differentiated frozen commodities in a moving differentiated frozen mass, said conduit having an outlet at its opposite end, and rotatable means having an axis coincident with the longitudinal axis of the conduit between said inlets and outlet actuated solely by the movement of the frozen mass for intertwining said differentiated commodities without intermixing the same, said rotatable means extending to either side of said coincident axes.

2. A device in accordance with claim 1, wherein the rotatable means is formed with a single complete spiral blade.

J. D. BALLARD.